Oct. 11, 1966     G. C. DUCKWORTH     3,278,097
SKI CARRIER
Filed Aug. 16, 1965
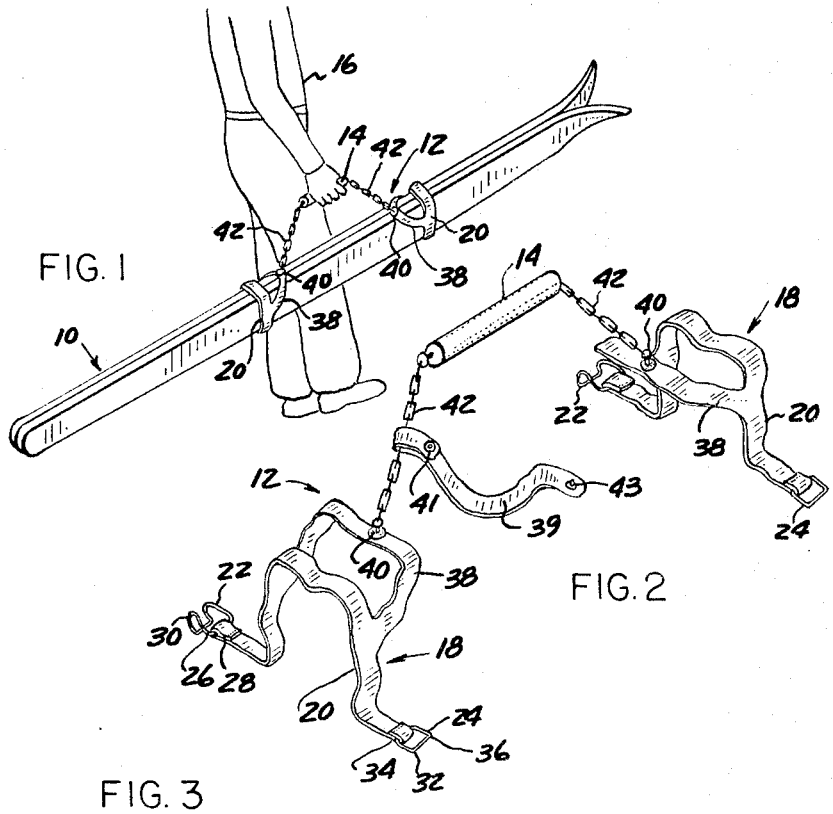
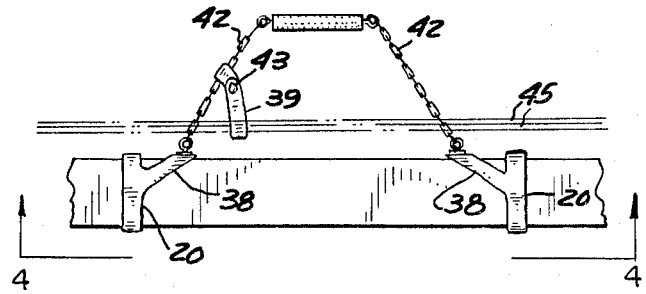
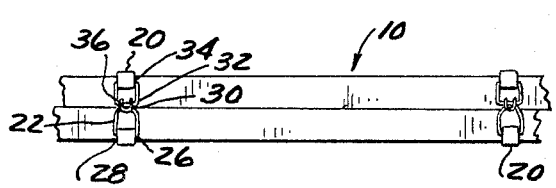
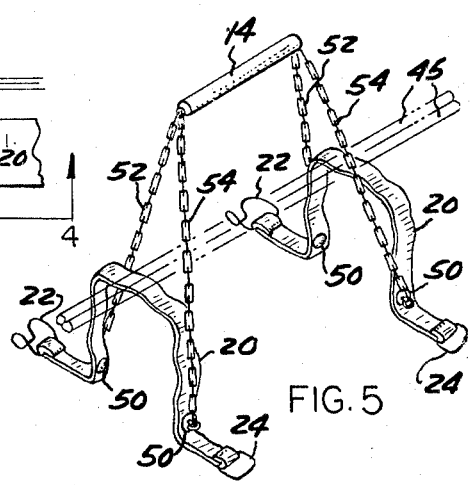
INVENTOR
GLENN C. DUCKWORTH
BY *Allen M Krass*
ATTORNEY

United States Patent Office 3,278,097
Patented Oct. 11, 1966

3,278,097
SKI CARRIER
Glenn C. Duckworth, 32520 W. Haverford,
Franklin, Mich.
Filed Aug. 16, 1965, Ser. No. 479,893
2 Claims. (Cl. 224—55)

This invention relates to a device for clamping a pair of skis together which also provides a convenient hand grip or handle for carrying the joined skis. Skiers must often carry their skis between the slopes and their autos or lodges. The length of the skis makes them awkward to handle and the traditional manner of carrying them is to balance them over one shoulder and to support them at their downwardly directed forward ends, which is a difficult procedure at best. Accordingly, a number of devices have been proposed for locking a pair of skis together and providing a handle for supporting the skis at their center of balance. Past devices have been fairly complicated and difficult to apply to and remove from the skis and have not gained popularity. The present invention contemplates such a clamp and handle device which is extremely simple in construction and easy to apply to and remove from the skis. Additionally, it is very compact so that it may be carried on the person while skiing, in an unobtrusive manner. Because of its simplicity the carrier of the present invention is low in cost and highly reliable in operation and provides a convenient manner for storing skis as well as carrying them.

As disclosed in the following descriptions of two preferred embodiments of the invention, the carrier includes a pair of elongated rubber clamps that are adapted to be attached to a pair of skis aligned bottom-to-bottom, at spaced points located near the center of the skis. Each clamp consists of a rubber strap having a pair of mating connectors disposed at its ends. The clamps are of such a length that their mating ends may be joined together in a locked relation by wrapping the clamp transversely about the pair of skis and providing a slight stretch before mating the ends together. The resultant tension of the mated connectors maintains them in a locked position while in use and they may be easily released by stretching the rubber sufficiently to pull the mating ends apart. Each of the straps is joined to an elongated flexible rubber handle that is positioned midway between the clamps by a loose chain section. In one of the embodiments, the connecting chain is joined to both of the sides of the clamps to provide a balanced arrangement. In the other embodiment of the invention each of the clamp straps has an extending section which passes around one of the edges of the set of skis and supports the connecting chain at the edge, to provide a balanced arrangement. In both embodiments the connections between the handle and the straps pass on both sides of the skis to provide side supports. The clamp straps are positioned so that the handle chains are not stretched out tightly but loosely extend from the clamps so that the handle may be separated from the skis. The clamps retain the skis in a desirable locked relationship which may also maintain the camber of the skis while they are in storage. The handle allows both skis to be easily carried with one hand. When removed, the carrier occupies little volume and may be carried in a pocket of a ski jacket without burdening its wearer.

The devices formed in accordance with the present invention also provide means for retaining a pair of ski poles. In one embodiment of the invention, an elongated flexible strap has one end joined to one of the connecting chains and has a pair of snap fasteners positioned along its length. The snap fasteners may be joined together to form a loop operative to retain a pair of ski poles in parallel alignment to the supported skis. In the other embodiment of the invention, the ski poles may be retained between the pair of connecting chains in alignment with the skis.

It is therefore seen to be a primary object of the present invention to provide a ski clamp and carrier consisting of a pair of elongated resilient clamp straps having connector members on their opposed ends which may be joined to the mid-section of the skis at spaced points by wrapping them about the width of the skis and joining the connector sections together, and an elongated handle member disposed between the clamps and joining to them by flexible members connected in a balanced relationship.

Another object is to provide such a clamp and carrier wherein the handle is joined to the clamps by connecting members which extend on both sides of the clamp straps whereby the handle is supported outwardly from the edges of the skis so that they may be supported in a generally vertical alignment.

Other objects, advantages and applications of the present invention will be made apparent by the following detailed description of two embodiments of the invention. The description makes reference to the accompanying drawing, in which:

FIGURE 1 is a pictorial representation of a skier carrying a pair of skis by means of a carrier which represents a first embodiment of my invention;

FIGURE 2 is a perspective view of the carrier forming the first embodiment of the invention;

FIGURE 3 is a side view, of the center section of the skis as joined together by a carrier formed in accordance with the first embodiment of the invention;

FIGURE 4 is a bottom view of the arrangement of FIGURE 3; and

FIGURE 5 is a perspective view of a carrier which forms the second embodiment of my invention.

Referring to the drawing, the broad purpose of the present invention is to provide a device for clamping together and carrying a pair of skis generally indicated at 10. The first embodiment of the invention, generally indicated at 12, is attached to the skis 10 at a pair of spaced points disposed generally adjacent to the center of the skis. The device 12 includes a round elongated handle member 14 which may be conveniently gripped by the skier 16 so that the skis are supported with their elongated axes in generally horizontal alignment with their surfaces disposed in a generally vertical plane.

In more particular, the carrier employs a pair of identical ski retaining clamps generally indicated at 18. Each clamp includes an elongated strap 20 formed of a resilient material, preferably rubber. The straps 20 are flat, thin and flexible. At one end each strap 20 carries a male connector member 22 and at their other end each strap carries a female connector member 24. The invention is not intended to be limited to the use of a particular connector member, and a variety of such connectors are known for joining the ends of resilient straps for locking skis together. Any such clamps would be useful in connection with the present invention. The male connectors 22 each consist of a closed loop of wire 26 having one straight section molded within an aperture 28 formed on the end of the strap 20 so that the loop is pivotably supported with respect to the strap. The wire loop has bends 30 at two points in the triangular end. The female connectors 24 similarly consist of a closed wire loop 32 having one straight section molded within an aperture 34 formed on the end of the strap 20. The loops 32 are bent and rebent as at 36 so as to provide a section which is adapted to receive the male member in stretched relation to lock the two together.

As thus far described, the straps 20 and the connectors 22 and 24 consists of a previously known clamp for joining a pair of skis together. This clamp is used by placing the skis in back-to-back and stretching the strap 20 transversely around the skis so that the connectors 22 and 24 meet at one end. The strap 20 is of such length that it must be stretched beyond its free length to cause the end 26 of the male connector to mate with the end 32 of the female connector. When the tension is released the two are locked together and may be only opened again by imposing tension on the strap 20 to pull them apart.

When used in connection with the first embodiment of the present invention, each of the straps 20 has a flat elongated section 38, formed of the same material as the strap 20, which is generally V-shaped and has its two free ends joined to one of the sides of the strap 20 so that its apex is directed away from this strap with its axis centered about the midpoint of the length of the strap 20. A metal cap 40 is molded on each section 38 at its apex. The end caps 40 are adapted to retain the ends of a pair of chains 42 which are preferably of the globe and wire type wherein a plurality of small metal globes are joined together with thin links of wire. Other fine chain types could be equally useful in connection with the present invention. The extreme ends of the chains 42 are connected to the ends of the cylindrical rubber handle 14, thus joining the two strap sections 20 together.

The combined length of the two chains 42 and the handle 14 is preferably about six or eight inches. In use, the two clamp straps 20 are wrapped about a pair of back-to-back skis at points spaced approximately six inches apart, centered about the mid-section, or center of weight of the skis. Because of the presence of bindings on the skis it may be necessary to deviate somewhat from this ideal position. The straps are wrapped about the skis so that the connectors 22 and 24 are positioned adjacent one edge of the pair of skis. In this position the apexes of the extending sections 38 will also be positioned adjacent to the ski edges and the extending sections 38 will join to the strap sections 20 midway along opposite sides of the pair of skis.

In this position the chains 42 will extend from two points on the edges of the pairs of skis and there will be sufficient slack in the chains so that the handle 14 may be separated from the ski edges by a few inches. The skis may now be easily carried by the handle 14 in the manner illustrated in FIGURE 1. The handle may be retained on the skis while they are in storage or while the skis are on a car top carrier.

In order to retain the ski poles in an elongated strap 39 formed of a flexible material such as leather rubber is attached to one of the chains 42 approximately midway along the length. This strap 39 has a male snap 41 and a female snap 43 attached adjacent to its respective ends. As is seen in FIGURE 3 the snaps may be joined together forming a loop of the section 39 which may be passed around a pair of ski poles 45 as to retain the ski poles in parallel alignment with the skis while they are being carried.

The second embodiment of the invention employs a rubber handle 14 and flexible straps 20 which are identical to those of the first embodiment. The connector members 22 and 24 may also be of the same variety employed in the first embodiment of the invention. The feature that distinguishes the second embodiment from the first embodiment of the invention is that the second embodiment has a pair of plates 50 molded in the outer face of the straps 20 at points approximately one-third of the distance from each end. These plates each retain an elongated ball and wire chain link section 52 and 54.

The two sections 52 and 54 have a length approximately one and a half times the width of the skis. At their extreme ends they are joined at 56 to the connecting chain sections 42 which join to the handles 14.

Since one of the chain sections 52 and 54 extends across each face of the skis when the straps 20 are properly positioned, the connections 56 with the end chains 42 will fall adjacent to the edges of the skis so that when the handle 14 is supported the chains 52 and 54 will fall along the opposite faces of the skis and provide support for retaining skis with their surfaces in vertical alignment, thus the length of the chains 52 and 54 falling across the greater part of the width of the skis will prevent them from twisting out of the vertical alignment.

A pair of ski poles 45 may be retained in parallel alignment with the skis by passing them between the pair of chains 52 and 54 so that they rest above the upper edge of the skis.

When either of the embodiments of the invention are removed from the skis by simply stretching the straps 20 so as to free the male connectors 22 from the female connectors 24 they form a unit of low bulk which may be easily stored about the person of the skier.

Another advantage of the construction of the second embodiment of the invention is that it may easily employ straps 20 which are already commercially available. By simply attaching the plates 50 to spaced points on each of a pair of straps, a unit in accordance with the present invention may be formed.

Having thus described my invention, I claim:

1. A device for clamping together a pair of skis and providing a handle for carrying the skis in a generally horizontal position, comprising: a pair of elongated resilient straps having connecting members at each of their ends adapted to be wrapped around the width of a pair of skis joined back-to-back, with their ends interlocked; an elongated handle member; and connecting members joined to each of the straps at two spaced points so as to provide connecting surfaces passing along both of the outer faces of the pair of skis when the skis are in locked position, and joining at their extreme ends to the handle member.

2. A clamp and carrier adapted to retain and support a pair of skis joined in a back-to-back relationship, comprising: a pair of clamp members each consisting of an elongated resilient strap having joinable connectors on its extreme end, said straps adapted to be joined about a pair of back-to-back skis by wrapping them around the width of the skis so that the connector members are joined at one edge of the skis, and stretching the straps so as to bring the connector members into locked position with one another, and releasing the tension from the straps; an elongated handle member; and two pairs of connecting sections extending from opposite sides of the handle member with one pair joined to each of the clamp straps, each pair of connecting sections passing along an opposite face of the pair of skis and having their free ends joined to the straps on opposite faces of the skis.

References Cited by the Examiner
UNITED STATES PATENTS

| | | | |
|---|---|---|---|
| 2,530,695 | 11/1950 | Helmert | 224—45 X |
| 2,565,006 | 8/1951 | Trickey | 224—52 |
| 3,220,626 | 11/1965 | Tupper | 224—55 |

GERALD M. FORLENZA, *Primary Examiner.*

F. WERNER, *Assistant Examiner.*